United States Patent
Osanishi et al.

(10) Patent No.: US 12,157,827 B2
(45) Date of Patent: Dec. 3, 2024

(54) INKJET INK

(71) Applicant: KYOCERA Document Solutions Inc., Osaka (JP)

(72) Inventors: Katsuki Osanishi, Osaka (JP); Mitsuko Miyata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 869 days.

(21) Appl. No.: 17/318,180

(22) Filed: May 12, 2021

(65) Prior Publication Data

US 2021/0355333 A1 Nov. 18, 2021

(30) Foreign Application Priority Data

May 13, 2020 (JP) .................................. 2020-084315
Sep. 28, 2020 (JP) .................................. 2020-162132

(51) Int. Cl.
*C09D 11/00* (2014.01)
*C09C 1/48* (2006.01)
*C09D 11/324* (2014.01)

(52) U.S. Cl.
CPC .............. *C09D 11/324* (2013.01); *C09C 1/48* (2013.01); *C01P 2006/12* (2013.01); *C01P 2006/19* (2013.01); *C01P 2006/22* (2013.01); *C01P 2006/90* (2013.01)

(58) Field of Classification Search
CPC ..... C09D 11/324; C09C 1/48; C01P 2006/12; C01P 2006/19; C01P 2006/22; C01P 2006/90
USPC .......................... 106/31.01, 31.13, 31.6, 31.9
See application file for complete search history.

(56) References Cited

U.S. PATENT DOCUMENTS 6,503,311 B1    1/2003  Karl et al.

FOREIGN PATENT DOCUMENTS

EP          1125754 A1 *  8/2001  .............. B41J 31/05
JP       2001-164148 A     6/2001

* cited by examiner

*Primary Examiner* — James E McDonough
(74) *Attorney, Agent, or Firm* — Studebaker & Brackett PC (57) ABSTRACT

An inkjet ink contains at least a first carbon black, a second carbon black, and water. The first carbon black has a DBP oil absorption of less than 130 mL/100 g and a BET specific surface area of less than 300 m²/g. The second carbon black has a DBP oil absorption of at least 130 mL/100 g and a BET specific surface area of at least 300 m²/g.

8 Claims, 1 Drawing Sheet

INKJET INK

INCORPORATION BY REFERENCE

The present application claims priority under 35 U.S.C. § 119 to Japanese Patent Application No. 2020-084315, filed on May 13, 2020, and Japanese Patent Application No. 2020-162132, filed on Sep. 28, 2020. The contents of these applications are incorporated herein by reference in their entirety.

BACKGROUND

The present disclosure relates to an inkjet ink.

An image is formed on a recording medium by ejecting inkjet ink from a recording head of an inkjet recording apparatus. For example, usage of an aqueous carbon black dispersion liquid in an inkjet ink is known. In order to stabilize the aqueous carbon black dispersion liquid, at least one type of ozonated carbon black is contained in the aqueous carbon black dispersion liquid.

SUMMARY

An inkjet ink according to an aspect of the present disclosure contains at least water, a first carbon black having a DBP oil absorption of less than 130 mL/100 g and a BET specific surface area of less than 300 m$^2$/g, and a second carbon black having a DBP oil absorption of at least 130 mL/100 g and a BET specific surface area of at least 300 m$^2$/g.

DETAILED DESCRIPTION

Figure 1:
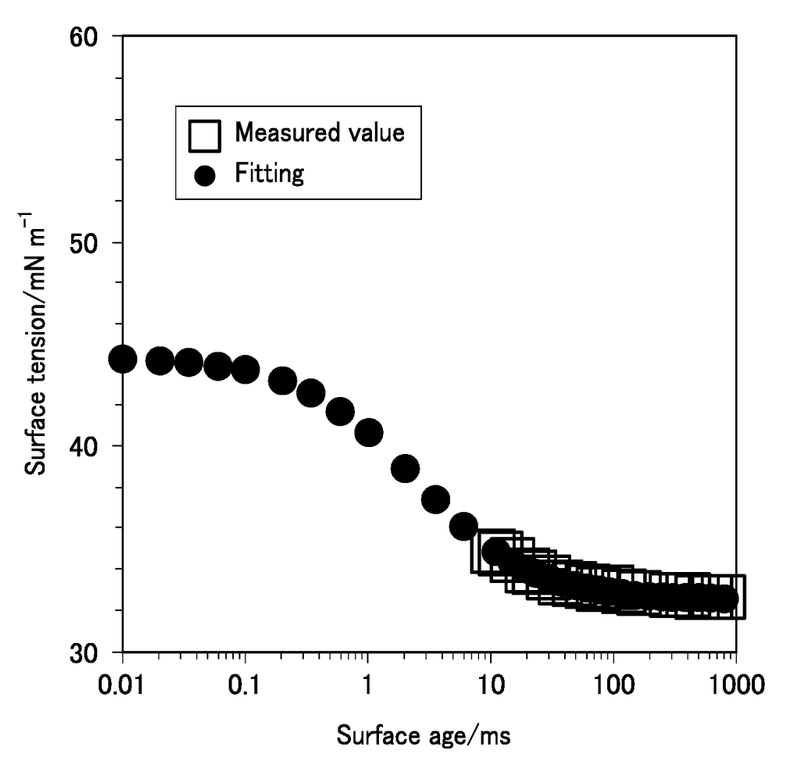
FIGURE is a graph representation showing an example of a relationship between dynamic surface tension and surface age in measurement of the dynamic surface tension of an ink by a maximum bubble pressure method.

The following describes an embodiment of the present disclosure. In the following description, the term "-based" may be appended to the name of a chemical compound to form a generic name encompassing both the chemical compound itself and derivatives thereof. Also, when the term "-based" is appended to the name of a chemical compound used in the name of a polymer, the term indicates that a repeating unit of the polymer originates from the chemical compound or a derivative thereof. Values for mass average molecular weight are values measured by gel permeation chromatography unless otherwise stated. Values for a glass transition point are values measured using a differential scanning calorimeter ("DSC-6220", product of Seiko Instruments Inc.) in accordance with "Japanese Industrial Standard (JIS) K7121-2012" unless otherwise stated. On a heat absorption curve (vertical axis: heat flow (DSC signal), horizontal axis: temperature) plotted using the differential scanning calorimeter, the glass transition point (Tg) corresponds to a temperature of an inflection point derived from glass transition (specifically, temperature at an intersection point of an extrapolation of the base line and an extrapolation of the inclined portion of the curve). Hydrophobicity can be expressed in terms of a contact angle of a water droplet, for example. The larger the contact angle of a water droplet is, the higher the hydrophobicity is. Any one type of each component disclosed in the present specification may be used independently, or a combination of any two or more types of the component may be used.

<Inkjet Ink>

The present embodiment relates to an inkjet ink (also referred to below as an ink). The ink according to the present embodiment contains at least a first carbon black, a second carbon black, and water. The ink according to the present embodiment is a water-based ink containing water.

(Carbon Black)

The ink contains two types of carbon black, that is, a first carbon black and a second carbon black. The first carbon black has a DBP oil absorption of less than 130 mL/100 g and a BET specific surface area of less than 300 m$^2$/g. The second carbon black has a DBP oil absorption of at least 130 mL/100 g and a BET specific surface area of at least 300 m$^2$/g.

As a result of the ink containing the first carbon black and the second carbon black, it is possible to form images having high image density, reduce ejection deviation of the ink from nozzles, improve continuous ejectability and intermittent ejectability, and suppress wet spreading of the ink in a recording medium. Presumably, the reasons for this are as follows.

The first carbon black having a DBP oil absorption of less than 130 mL/100 g and a BET specific surface area of less than 300 m$^2$/g tends to have higher blackness than the second carbon black. However, the first carbon black readily enters the inside of a recording medium (e.g., paper) once an ink lands on the recording medium. Therefore, an image formed with an ink containing only the first carbon black as carbon black is low in image density although the first carbon black has high blackness. By contrast, the second carbon black having a DBP oil absorption of at least 130 mL/100 g and a BET specific surface area of at least 300 m$^2$/g includes primarily particles that aggregate more readily than those of the first carbon black so that structure that is an aggregate of the primary particles tends to grow. Once an ink lands on a recording medium (e.g., paper), space between fibers of the recording medium are filled with the structure of the second carbon black. The structure of the second carbon black as above prevents the first carbon black from entering the inside of the recording medium. As a result of the first carbon black with high blackness remaining on the surface of the recording medium, an image having high image density can be formed on the recording medium.

By contrast, the second carbon black having a DBP oil absorption of at least 130 mL/100 g and a BET specific surface area of at least 300 m$^2$/g tends to be difficult to disperse in water. Therefore, an ink containing only the second carbon black as carbon black has low dispersion stability and accordingly tends to be difficult to be ejected from nozzles. As a result of the ink containing the first carbon black in addition to the second carbon black, dispersion stability of the ink increases and the ink is easily ejected from nozzles. Thus, ejection deviation of the ink from the nozzles can be reduced.

Furthermore, as a result of the ink containing the first carbon black in addition to the second carbon black, dynamic surface tensions of the ink as measured by the maximum bubble pressure method (bubble pressure method) can be easily adjusted within specific ranges described later. Thus, wet spreading of the ink in a recording medium can be suppressed in landing of the ink on the recording medium.

Furthermore, as a result of the ink containing the first carbon black and the second carbon black, the dynamic surface tensions and a relaxation time of the ink as measured by the maximum bubble pressure method can be easily adjusted within respective specific ranges described later. Thus, the ink according to the present embodiment provides excellent continuous ejectability even in high-speed printing (e.g., printing using an inkjet recording apparatus including a piezoelectric recording head with a drive frequency of 20 kHz or higher). The ink according to the present embodiment also provides excellent intermittent ejectability. Note that the term continuous ejectability in the present specification refers to a property of an ink with which stable ink ejection from nozzles of a recording head can be achieved even when printing is continuously performed on several sheets of recording medium. Yet, when an inkjet recording apparatus is on standby for a specific time period after printing interruption, a portion in which no carbon black is contained or less carbon black is contained (pale color portion) may be generated in the tip end of an ink droplet remaining in a nozzle included in the inkjet recording apparatus and a void may be accordingly generated in a formed image due to presence of the pale portion when printing is resumed. The term intermittent ejectability refers to a property of an ink with which a void generated due to presence of a pale portion such as above can be suppressed.

The first carbon black will be described next. As previously described, the DBP oil absorption of the first carbon black is less than 130 mL/100 g. Preferably, the DBP oil absorption of the first carbon black is no greater than 128 mL/100 g. Although no particular limitations are placed on the lower limit of the DBP oil absorption of the first carbon black, the DBP oil absorption of the first carbon black is preferably at least 1 mL/100 g, and more preferably at least 50 mL/100 g.

As previously described, the BET specific surface area of the first carbon black is less than 300 m$^2$/g. Preferably, the BET specific surface area of the first carbon black is no greater than 295 m$^2$/g. Although no particular limitations are placed on the lower limit of the BET specific surface area of the first carbon black, the BET specific surface area of the first carbon black is preferably at least 90 m$^2$/g, and more preferably at least 180 m$^2$/g.

Examples of the first carbon black include COLOUR BLACK S160 (DBP oil absorption 128 mL/100 g, BET specific surface area 180 m$^2$/g), SPECIAL BLACK 4 (DBP oil absorption 115 mL/100 g, BET specific surface area 180 m$^2$/g), SPECIAL BLACK 4A (DBP oil absorption 95 mL/100 g, BET specific surface area 180 m$^2$/g), PRINTEX U (DBP oil absorption 115 mL/100 g, BET specific surface area 92 m$^2$/g), PRINTEX V (DBP oil absorption 115 mL/100 g, BET specific surface area 92 m$^2$/g), PRINTEX 140U (DBP oil absorption 115 mL/100 g, BET specific surface area 90 m$^2$/g), PRINTEX 140V (DBP oil absorption 115 mL/100 g, BET specific surface area 90 m$^2$/g), PRINTEX 95 (DBP oil absorption 52 mL/100 g, BET specific surface area 240 m$^2$/g), HIBLACK 970LB (DBP oil absorption 65 mL/100 g, BET specific surface area 295 m$^2$/g), HIBLACK 930L (DBP oil absorption 65 mL/100 g, BET specific surface area 275 m$^2$/g), HIBLACK 890 (DBP oil absorption 95 mL/100 g, BET specific surface area 270 m$^2$/g), PRINTEX 85 (DBP oil absorption 54 mL/100 g, BET specific surface area 200 m$^2$/g), PRINTEX 80 (DBP oil absorption 105 mL/100 g, BET specific surface area 225 m$^2$/g), PRINTEX 75 (DBP oil absorption 53 mL/100 g, BET specific surface area 145 m$^2$/g), HIBLACK 600L (DBP oil absorption 72 mL/100 g, BET specific surface area 235 m$^2$/g), HIBLACK 50L (DBP oil absorption 55 mL/100 g, BET specific surface area 188 m$^2$/g), PRINTEX F85 (DBP oil absorption 54 mL/100 g, BET specific surface area 200 m$^2$/g), PRINTEX F80 (DBP oil absorption 105 mL/100 g, BET specific surface area 225 m$^2$/g), PRINTEX F alfa (DBP oil absorption 100 mL/100 g, BET specific surface area 105 m$^2$/g), and PRINTEX FP (DBP oil absorption 102 mL/100 g, BET specific surface area 120 m$^2$/g), each of which is produced by Orion Engineered Carbons S. A.

The second carbon black will be described next. As previously described, the DBP oil absorption of the second carbon black is at least 130 mL/100 g. Preferably, the DBP oil absorption of the second carbon black is at least 140 mL/100 g. Although no particular limitations are placed on the upper limit of the DBP oil absorption of the second carbon black, the DBP oil absorption of the second carbon black is preferably no greater than 300 mL/100 g, more preferably no greater than 200 mL/100 g, and further preferably no greater than 175 mL/100 g.

As previously described, the BET specific surface area of the second carbon black is at least 300 m$^2$/g. Although no particular limitations are placed on the upper limit of the BET specific surface area of the second carbon black, the BET specific surface area of the second carbon black is preferably no greater than 700 m$^2$/g, more preferably no greater than 600 m$^2$/g, and further preferably no greater than 575 m$^2$/g.

Examples of the second carbon black include COLOUR BLACK FW285 (DBP oil absorption 175 mL/100 g, BET specific surface area 350 m$^2$/g), COLOUR BLACK FW200 (DBP oil absorption 160 mL/100 g, BET specific surface area 550 m$^2$/g), COLOUR BLACK FW2 (DBP oil absorption 155 mL/100 g, BET specific surface area 350 m$^2$/g), COLOUR BLACK FW1 (DBP oil absorption 150 mL/100 g, BET specific surface area 320 m$^2$/g), COLOUR BLACK FW182 (DBP oil absorption 148 mL/100 g, BET specific surface area 572 m$^2$/g), and SPECIAL BLACK 6 (DBP oil absorption 142 mL/100 g, BET specific surface area 450 m$^2$/g), each of which is produced by Orion Engineered Carbons S.A.

In order to further increase image density of formed images, further reduce ejection deviation of the ink from nozzles, and further suppress wet spreading of the ink in a recording medium, a difference ($D_2-D_1$) between the DBP oil absorption ($D_1$) of the first carbon black and the DBP oil absorption ($D_2$) of the second carbon black is preferably at least 20 mL/100 g and no greater than 110 mL/100 g, and more preferably at least 30 mL/100 g and no greater than 110 mL/100 g.

In order to further increase image density of formed images, further reduce ejection deviation of the ink from nozzles, and further suppress wet spreading of the ink in a recording medium, a difference ($B_2-B_1$) between the BET specific surface area ($B_1$) of the first carbon black and the BET specific surface area ($B_2$) of the second carbon black is preferably at least 50 m$^2$/g and no greater than 400 m$^2$/g, and more preferably at least 55 m$^2$/g and no greater than 390 m$^2$/g.

Each DBP oil absorption of the first carbon black and the second carbon black is measured by a method conforming to for example ISO 4656:2012 (Rubber compounding ingredients—Carbon black—Determination of oil absorption number (OAN) and oil absorption number of compressed sample (COAN)). Each BET specific surface area of the first carbon black and the second carbon black is measured by a method conforming to for example ISO 4652:2012 (Rubber compounding ingredients—Carbon black—Determination of specific surface area by nitrogen adsorption methods—Single-point procedures).

Examples of the carbon blacks (first carbon black and second carbon black) include furnace black, channel black, thermal black, and acetylene black.

An example of a method for producing a carbon black (first carbon black or second carbon black) is an oil furnace method. The oil furnace method is performed as follows, for example. A reactor is used which is a cylindrical reactor lined with refractory bricks and which includes a combustion area, a reaction area, and a reaction stop area coaxially connected in series. Using the reactor, a fuel is burned in the combustion area to generate high-temperature combustion gas, thereby causing a combustion gas flow. Next, raw hydrocarbon is introduced into the combustion gas flow in the reaction area and incomplete combustion and thermal decomposition of the raw hydrocarbon are caused to convert hydrocarbon to carbon black. Subsequently, the gas flow containing the carbon black is quenched in the reaction stop area to stop the reaction. The carbon black is then collected, thereby obtaining the carbon black. In the above production method, for example, the particle diameter of the carbon black increases and the BET specific surface area thereof decreases as the temperature of the combustion gas flow into which the raw hydrocarbon is introduced is reduced. Furthermore, the structure of the carbon black increases and the DBP oil absorption thereof increases as the amount of the raw hydrocarbon introduced into the combustion gas flow is increased. This is because core formation speed increases and frequency of collision between particles of the raw hydrocarbon increases as an abundance ratio of the raw hydrocarbon (concentration of the raw hydrocarbon in the combustion gas flow) in thermal decomposition is increased. Note that a commercially available carbon black having a desired DBP oil absorption and a desired BET specific surface area may be used as the first carbon black or the second carbon black.

A total content ratio of the first carbon black and the second carbon black is preferably at least 4% by mass and no greater than 10% by mass relative to mass of the ink, and more preferably at least 6% by mass and no greater than 8% by mass. As a result of the total content ratio of the first carbon black and the second carbon black being at least 4% by mass, image density of formed images increases. As a result of the total content ratio of the first carbon black and the second carbon black being no greater than 10% by mass, the ink can have favorable viscosity and excellent dispersion stability.

In order to further increase image density of formed images, further reduce ejection deviation of the ink from nozzles, and further suppress wet spreading of the ink in a recording medium, the content ratio of the first carbon black is preferably at least 1% by mass and no greater than 9% by mass relative to the mass of the ink, and more preferably at least 2% by mass and no greater than 6% by mass.

In order to further increase image density of formed images, further reduce ejection deviation of the ink from nozzles, and further suppress wet spreading of the ink in a recording medium, the content ratio of the second carbon black is preferably at least 1% by mass and no greater than 9% by mass relative to the mass of the ink, and more preferably at least 1% by mass and no greater than 4% by mass. Furthermore, when the content ratio of the second carbon black is no greater than 4% by mass, formation of images which are excellent in scratch resistance can be achieved.

In order to further increase image density of formed images, further reduce ejection deviation of the ink from nozzles, and further suppress wet spreading of the ink in a recording medium, the content ratio of the first carbon black is preferably at least 0.5 parts by mass and no greater than 3.0 parts by mass relative to 1.0 parts by mass of the second carbon black, more preferably at least 0.8 parts by mass and no greater than 3.0 parts by mass, and further preferably at least 1.0 parts by mass and no greater than 3.0 parts by mass.

The first carbon black and the second carbon black are contained in a single ink. As such, the ink containing the first carbon black and the second carbon black is contained in a single ink tank. In a case in which an ink containing the first carbon black but not containing the second carbon black and an ink containing the second carbon black but not containing the first carbon black are contained in different ink tanks, for example, the following disadvantages are experienced. That is, the ink containing the second carbon black but not containing the first carbon black has low dispersion stability and is accordingly difficult to be ejected from nozzles. Furthermore, it is necessary to individually eject one of the inks and the other of the inks from two different nozzles, which invites complication in configuration of an inkjet recording apparatus including the nozzles. When there is deviation between a point of a recording medium where one of the inks lands and a point of the recording medium where the other of the inks lands, advantages are difficult to obtain. In a case in which the conveyance speed of a recording medium is slow, one of the inks is soaked into the recording medium before the other of the inks is ejected. Thus, advantages are difficult to obtain. In order to overcome the above disadvantages, the first carbon black and the second carbon black are contained in a single ink in the present embodiment.

Note that either of the first carbon black and the second carbon black may not be a self-dispersion type carbon black. Furthermore, either of the first carbon black and the second carbon black may not be ozonated. In a case in which neither the first carbon black nor the second carbon black is ozonated, the ink can be produced without inviting complication of production processes as far as possible because ozonation is unnecessary. The ink may only contain the first carbon black and the second carbon black as pigments. Alternatively, the ink may further contain as a pigment, in addition to the first carbon black and the second carbon black, a carbon black other than these carbon blacks or a pigment other than carbon black.

(Shear Viscosity of Ink) Preferably, the ink has a shear viscosity of at least 6 mPa·s and no greater than 8 mPa·s at a temperature of 39° C. and a shearing speed of 50 $s^{-1}$. In the following description, a "shear viscosity of an ink at a temperature of 39° C. and a shearing speed of 50 $s^{-1}$" may be also referred to as a "50 $s^{-1}$ viscosity".

Preferably, the ink has a shear viscosity of at least 4 mPa·s and no greater than 6 mPa·s at a temperature of 39° C. and a shearing speed of 100,000 $s^{-1}$. In the following description, a "shear viscosity of an ink at a temperature of 39° C. and a shearing speed of 100,000 $s^{-1}$" may be also referred to as a "100,000 $s^{-1}$ viscosity".

The temperature 39° C. is near the temperature of the inside of a recording head included in an inkjet recording apparatus and near the temperature of the ink at ejection from the recording head. The shearing speed 50 $s^{-1}$ is near the shearing speed at ink landing on a recording medium. The shearing speed 100,000 $s^{-1}$ is near the shearing speed at ink ejection from the recording head. As such, when the 100,000 $s^{-1}$ viscosity that corresponds to a shear viscosity at ink ejection from the recording head and the 50 $s^{-1}$ viscosity that corresponds to a shear viscosity at ink landing on the recording medium fall in respective specific ranges, movement of ink droplets from ink ejection to ink landing can be controlled. As a result, ejection deviation of the ink from nozzles can be further reduced.

In order to further reduce ejection deviation of the ink from nozzles, the 50 $s^{-1}$ viscosity is preferably higher than the 100,000 $s^{-1}$ viscosity.

The 50 $s^{-1}$ viscosity and the 100,000 $s^{-1}$ viscosity of the ink are measured for example by a method described in association with Examples.

As a result of the ink containing the first carbon black and the second carbon black, the 50 $s^{-1}$ viscosity and the 100,000 $s^{-1}$ viscosity of the ink are easily adjusted within the respective specific ranges. Furthermore, when the ink further contains a water-soluble organic solvent, the 50 $s^{-1}$ viscosity and the 100,000 $s^{-1}$ viscosity of the ink can be further easily adjusted within the respective specific ranges.

Because production of an ink having a 50 $s^{-1}$ viscosity and a 1000000 $s^{-1}$ viscosity within the respective specific ranges can be facilitated, the water-soluble organic solvent preferably includes a first water-soluble organic solvent, glycerin, and triethylene glycol monobutyl ether. The first water-soluble organic solvent is at least one type (preferably, one or two types) selected from the group consisting of 1,3-propanediol, propylene glycol, 1,3-butanediol, triethylene glycol monomethyl ether, and triethylene glycol. Note that the water-soluble organic solvent will be described later in detail.

Because production of an ink having a 50 $s^{-1}$ viscosity and a 100,000 $s^{-1}$ viscosity within the respective specific ranges can be facilitated, a ratio Mb/Ma of mass Mb of glycerin to mass Ma of triethylene glycol monobutyl ether is preferably at least 0.5 and no greater than 0.7. For the same reason as above, a ratio Mc/Ma of mass Mc of the first water-soluble organic solvent to the mass Ma of triethylene glycol monobutyl ether is preferably at least 1 and no greater than 4. For the same reason as above, a ratio Ma/Mw of the mass Ma of triethylene glycol monobutyl ether to mass Mw of the water is preferably at least 0.1 and no greater than 0.5.

Because production of an ink having a 50 $s^{-1}$ viscosity and a 100,000 $s^{-1}$ viscosity within the respective specific ranges can be facilitated, the content ratio of the water-soluble organic solvent is preferably at least 20% by mass and no greater than 45% by mass relative to the mass of the ink. For the same reason as above, a ratio Ms/Mw of mass Ms of the water-soluble organic solvent to the mass Mw of the water is preferably at least 0.3 and no greater than 1.5. For the same reason as above, a ratio Ms/$M_1$ of the mass Ms of the water-soluble organic solvent to mass $M_1$ of the first carbon black is preferably at least 3 and no greater than 12. For the same reason as above, a ratio Ms/$M_2$ of the mass Ms of the water-soluble organic solvent to mass $M_2$ of the second carbon black is preferably at least 5 and no greater than 30.

(Dynamic Surface Tension and Relaxation Time of Ink)

the Following Describes Dynamic Surface Tension and Relaxation Time of the Ink as measured by the maximum bubble pressure method with reference to FIGURE. FIGURE illustrates an example of the relationship between dynamic surface tension ($\gamma$) and surface age t in measurement of the dynamic surface tension of the ink by maximum bubble pressure method. In FIGURE, the vertical axis indicates the dynamic surface tension ($\gamma$) (unit: mN/m) of the ink and the horizontal axis indicates surface age t (unit: millisecond) of the ink. The dynamic surface tension ($\gamma$) of the ink decreases with an increase in the surface age t thereof. A dynamic surface tension ($\gamma_0$) at a surface age of 0.01 milliseconds is the dynamic surface tension ($\gamma$) of the ink directly after interface formation. The dynamic surface tension ($\gamma_0$) corresponds to a surface tension of a composition obtained by removing a surfactant from the ink. A dynamic surface tension ($\gamma_{eq}$) at a surface age of 1000 milliseconds is the dynamic surface tension ($\gamma$) of the ink in a state in which the dynamic surface tension ($\gamma$) is in an state of equilibrium. The dynamic surface tension ($\gamma_{eq}$) corresponds a static surface tension of the ink. A relaxation time $\tau$ is the surface age t at a dynamic surface tension at the middle of the dynamic surface tension ($\gamma_0$) and the dynamic surface tension ($\gamma_{eq}$), that is at ($\gamma_0+\gamma_{eq}$)/2. A smaller value of the relaxation time $\tau$ indicates a quicker decrease in the dynamic surface tension ($\gamma$) of the ink.

Note that in measurement of the dynamic surface tension ($\gamma$) of an ink by the maximum bubble pressure method, it is difficult to measure the dynamic surface tension ($\gamma$) at an extremely short surface age t (e.g., a surface age t of no greater than 10 milliseconds). Therefore, the dynamic surface tension ($\gamma$) of the ink at an extremely short surface age t may be obtained by the following method rather than actual measurement. First, the dynamic surface tension ($\gamma$) of the ink at a measureable surface age t (e.g., at least 10 milliseconds and no greater than 1000 milliseconds) is measured. Next, a dynamic surface tension ($\gamma$) at an extremely short surface age t (e.g., at least 0.01 milliseconds and less than 10 milliseconds) is fitted by the least-squares method so as to hold the following formula (I). The dynamic surface tension ($\gamma$) of the ink at an extremely short surface age t can be obtained in this manner. Note that the fitting by the least-squares method is based on a curve fitting with the Hua-Rosen equation.

$$\gamma(t)=\gamma_{eq}+(\gamma_0-\gamma_{eq})/\{1+(t/\tau)^k\} \quad (I)$$

In formula (I), t represents a surface age (unit: millisecond). $\gamma(t)$ represents a dynamic surface tension (unit: mN/m) of the ink at the surface age t (unit: millisecond). $\gamma_0$ represents a dynamic surface tension (unit: mN/m) of the ink at a surface age of 0.01 milliseconds. $\gamma_{eq}$ represents a dynamic surface tension (unit: mN/m) of the ink at a surface age of 1000 milliseconds. $\tau$ represents a relaxation time corresponding to a surface age t (unit: millisecond) when $\gamma(t)=(\gamma_0+\gamma_{eq})/2$. k is a constant.

In order to further suppress wet spreading of the ink in a recording medium and further increase image density while maintaining ease of droplet cohesion of the ink, it is preferable that the dynamic surface tension of the ink at a surface age of 10 milliseconds as measured by the maximum bubble pressure method is at least 39.0 mN/m and no greater than 43.0 mN/m and that the dynamic surface tension of the ink at a surface age of 50 milliseconds is at least 36.0 mN/m and no greater than 41.0 mN/m as measured by the maximum bubble pressure method. In the following description, the "dynamic surface tension of an ink at a surface age of 10 milliseconds as measured by the maximum bubble pressure method" is referred to as a "10-millisecond surface tension". Also, the "dynamic surface tension of an ink at a surface age of 50 milliseconds as measured by the maximum bubble pressure method" is referred to as a "50-millisecond surface tension".

The 10-millisecond surface tension of an ink corresponds to a dynamic surface tension of the ink directly after ink ejection from nozzles. When the 10-millisecond surface tension is at least 39.0 mN/m and no greater than 43.0 mN/m, droplets of the ink directly after ink ejection from nozzles tend to become spherical. As a result, the droplets of the ink easily cohere. The 50-millisecond surface tension of an ink corresponds to a dynamic surface tension of the ink at ink landing on a recording medium. When the 50-millisecond surface tension is at least 36.0 mN/m and no greater than 41.0 mN/m, wet spreading of the ink can be further suppressed at ink landing on a recording medium. The 10-millisecond surface tension, the 50-millisecond surface tension, and the later-described relaxation time of an ink are measured by methods described in association with Example, for example.

Preferably, the 10-millisecond surface tension is greater than the 50-millisecond surface tension in order to suppress wet spreading of the ink in a recording medium.

As previously described, as a result of the ink containing the first carbon black and the second carbon black, the 10-millisecond surface tension and the 50-millisecond surface tension of the ink can be easily adjusted within respective specific ranges.

Furthermore, when the ink further contains a surfactant, the 10-millisecond surface tension of the ink can be further easily adjusted within a specific range and the 50-millisecond surface tension of the ink can be further easily adjusted within a specific range (particularly, within a range of at least 36.0 mN/m and no greater than 41.0 mN/m). Because production of an ink having a 10-millisecond surface tension within the specific range and a 50-millisecond surface tension within the specific range (particularly, within a range of at least 36.0 mN/m and no greater than 41.0 mN/m) can be facilitated, the content ratio of the surfactant is preferably at least 0.5% by mass and no greater than 1.0% by mass relative to the mass of the ink. Note that the surfactant will be described later in detail.

As a result of the ink further containing a water-soluble organic solvent, it is further easy to adjust the 10-millisecond surface tension of the ink within the specific range and further easy to adjust the 50-millisecond surface tension within the specific range (particularly, within a range of at least 36.0 mN/m and no greater than 41.0 mN/m). Because production of an ink having a 10-millisecond surface tension within the specific range and a 50-millisecond surface tension within the specific range (particularly, within a range of at least 36.0 mN/m and no greater than 41.0 mN/m) can be facilitated, it is preferable that the ink further contains a water-soluble organic solvent and a polysaccharide. For the same reason as above, sorbitol is preferable as the polysaccharide. For the same reason as above, the water-soluble organic solvent preferably includes a second water-soluble organic solvent, 2-pyrrolidone, 3-methyl-1,5-pentanediol, and triethylene glycol. The second water-soluble organic solvent is either or both glycerin and propylene glycol. Note that the water-soluble organic solvent will be described later in detail.

Because production of an ink having a 10-millisecond surface tension within the specific range and a 50-millisecond surface tension within the specific range (particularly, within a range of at least 36.0 mN/m and no greater than 41.0 mN/m) can be facilitated, a ratio Me/Md of mass Me of 2-pyrrolidone to mass Md of triethylene glycol is preferably at least 0.3 and no greater than 0.7. For the same reason as above, a ratio Mf/Md of mass Mf of 3-methyl-1,5-pentanediol to the mass Md of triethylene glycol is preferably at least 3 and no greater than 5. For the same reason as above, a ratio Mg/Md of the mass Mg of the second water-soluble organic solvent to the mass Md of triethylene glycol is preferably at least 1.5 and no greater than 2.0. For the same reason as above, a ratio Mh/Md of mass Mh of the polysaccharide to the mass Md of triethylene glycol is preferably at least 0.1 and no greater than 0.5.

Because production of an ink having a 10-millisecond surface tension within the specific range and a 50-millisecond surface tension within the specific range (particularly, within a range of at least 36.0 mN/m and no greater than 41.0 mN/m) can be facilitated, the content ratio of the water-soluble organic solvent is preferably at least 20% by mass and no greater than 25% by mass relative to the mass of the ink. For the same reason as above, a ratio Ms/Mw of the mass Ms of the water-soluble organic solvent to the mass Mw of water is preferably at least 0.3 and no greater than 0.8. For the same reason as above, a ratio $Ms/M_1$ of the mass Ms of the water-soluble organic solvent to the mass $M_1$ of the first carbon black is preferably at least 5 and no greater than 10, and more preferably at least 6 and no greater than 8. For the same reason as above, a ratio $Ms/M_2$ of the mass Ms of the water-soluble organic solvent to the mass $M_2$ of the second carbon black is preferably at least 5 and no greater than 10, and more preferably at least 6 and no greater than 8.

In order to further improve continuous ejectability and intermittent ejectability and further increase image density, it is preferable that the dynamic surface tension of the ink at a surface age of 50 milliseconds as measured by the maximum bubble pressure method (i.e., 50-millisecond surface tension) is at least 40.0 mN/m and the relaxation time thereat is at least 20 milliseconds and no greater than 50 milliseconds.

Even in high-speed printing (e.g., printing using an inkjet recording apparatus including a piezoelectric recording head with a driving frequency of 20 kHz or higher), a meniscus of the ink can be stably formed in each nozzle of the recording head when the ink has a 50-millisecond surface tension of at least 40.0 mN/m. As a result, continuous ejectability of the ink is improved. Furthermore, when the ink has a relaxation time of at least 20 milliseconds and no greater than 50 milliseconds, a pale portion is difficult to generate in the tip end of an ink droplet remaining in each nozzle included in an inkjet recording apparatus even after the inkjet recording apparatus is on standby for a certain time period. As a result, intermittent ejectability of the ink is improved.

Although no particular limitations are placed on the upper limit of the 50-millisecond surface tension, the 50-millisecond surface tension is preferably no greater than 50.0 mN/m so that the ink may be excellent in continuous ejectability and intermittent ejectability, and more preferably no greater than 42.0 mN/m. The 50-millisecond surface tension is further preferably no greater than 41.0 mN/m in order to increase droplet cohesion of the ink and suppress wet spreading of the ink in a recording medium in addition to improving continuous ejectability and intermittent ejectability of the ink.

In order for the ink to be excellent in continuous ejectability and intermittent ejectability, the relaxation time of the ink is preferably within a range between two values selected from the group consisting of 20 milliseconds, 25 milliseconds, 30 milliseconds, 35 milliseconds, 40 milliseconds, 45 milliseconds, and 50 milliseconds.

As previously described, as a result of the ink containing the first carbon black and the second carbon black, the 50-millisecond surface tension of the ink can be easily adjusted within a specific range (particularly, within a range of at least 40.0 mN/m) and the relaxation time of the ink can be easily adjusted within a specific range.

Preferably, the ink further contains a surfactant in order for the ink to have a 50-millisecond surface tension within the specific range (particularly, within a range of at least 40.0 mN/m) and a relaxation time within the specific range. For the same purpose as above, the content ratio of the surfactant is preferably at least 0.5% by mass and no greater than 1.0% by mass relative to the mass of the ink, more preferably at least 0.5% by mass and no greater than 0.8% by mass, and still further preferably at least 0.5% by mass and no greater than 0.6% by mass. For the same purpose as above, the surfactant is preferably an acetylene-based surfactant or an acrylic acid-based surfactant, more preferably an acetylene-based surfactant (e.g., a surfactant having an acetylene glycol structure), and further preferably an ethylene oxide adduct of acetylene glycol. An ink containing an acetylene-based surfactant or an acrylic acid-based surfactant decreases in dynamic surface tension less than an ink containing a silicone-based surfactant or a fluorine-containing surfactant. Therefore, when the surfactant is an acetylene-based surfactant or an acrylic acid-based surfactant, an ink having a 50-millisecond surface tension within the specific range (particularly, within a range of at least 40.0 mN/m) can be easily produced.

Preferably, the ink further contains a water-soluble organic solvent in order for the ink to have a 50-millisecond surface tension within the specific range (particularly, within a range of at least 40.0 mN/m) and a relaxation time within the specific range. For the same purpose as above, it is preferable that the ink further contains a water-soluble organic solvent and a polysaccharide. For the same purpose as above, the polysaccharide is preferably sorbitol. For the same purpose as above, the water-soluble organic solvent preferably includes at least 3-methyl-1,5-pentanediol, and further preferably includes glycerin, propylene glycol, 2-pyrrolidone, 3-methyl-1,5-pentanediol, and triethylene glycol. For the same purpose as above, the content ratio of 3-methyl-1,5-pentanediol is preferably at least 10.0% by mass and no greater than 14.0% by mass relative to the mass of the ink, and further preferably at least 11.0% by mass and no greater than 13.0% by mass.

The ink may contain triethylene glycol monobutyl ether. However, it is preferable that the ink does not contain triethylene glycol monobutyl ether in order for the ink to be excellent in intermittent ejectability. This is because non-containment of triethylene glycol monobutyl ether, which has high hydrophobicity, makes separation of water contained in ink droplets difficult, so that a pale portion at the tip end of an ink droplet remaining in each nozzle can be further inhibited from being generated.

As previously described, as a result of the ink according to the present embodiment having the following features A and B, image density can be further increased and ejection deviation of the ink from nozzles can be further reduced. As also previously described, as a result of the ink according to the present embodiment having the following features A and C, image density can be further increased, ink droplets can readily cohere, and wet spreading of the ink in a recording medium can be further suppressed. Furthermore, as previously described above, as a result of the ink according to the present embodiment having the following features A and D, image density can be further increased and continuous ejectability and intermittent ejectability can be further improved. It can be determined from the above that as a result of the ink according to the present embodiment having the following features A, B, and C, image density can be further increased, ejection deviation of the ink from nozzles can be further reduced, droplets of the ink can readily cohere, and wet spreading of the ink in a recording medium can be further suppressed. It can be further determined from the above that as a result of the ink according to the present embodiment having the following features A, B, and D, image density can be further increased, ejection deviation of the ink from nozzles can be further reduced, and continuous ejectability and intermittent ejectability of the ink can be further improved. It can be still determined from the above that as a result of the ink according to the present embodiment having the following features A, C, and D, image density can be further increased, droplets of the ink can readily cohere, wet spreading of the ink in a recording medium can be further suppressed, and continuous ejectability and intermittent ejectability of the ink can be further improved. It can be further determined from the above that as a result of the ink according to the present embodiment having the following features A, B, C, and D, image density can be further increased, ejection deviation of the ink from nozzles can be further reduced, droplets of the ink can readily cohere, wet spreading of the ink in a recording medium can be further suppressed, and continuous ejectability and intermittent ejectability of the ink can be further improved.

Feature A: the ink contains at least the first carbon black, the second carbon black, and water.

Feature B: the ink has a 50 s$^{-1}$ viscosity of at least 6 mPa·s and no greater than 8 mPa·s and a 100,000 s$^{-1}$ viscosity of at least 4 mPa·s and no greater than 6 mPa·s.

Feature C: the ink has a 10-millisecond surface tension of at least 39.0 mN/m and no greater than 43.0 mN/m and a 50-millisecond surface tension of at least 36.0 mN/m and no greater than 41.0 mN/m.

Feature D: The ink has a 50-millisecond surface tension of at least 40.0 mN/m and a relaxation time of at least 20 milliseconds and no greater than 50 milliseconds.

(Water)

The water is preferably ion exchange water or deionized water. The content ratio of the water is preferably at least 20% by mass and no greater than 90% by mass relative to the mass of the ink, more preferably at least 40% by mass and no greater than 90% by mass, further preferably at least 40% by mass and no greater than 80% by mass, and particularly preferably at least 40% by mass and no greater than 70% by mass.

(Water-Soluble Organic Solvent)

As previously described, the ink may further contain a water-soluble organic solvent as necessary. In the present embodiment, the water-soluble organic solvent is an organic solvent that is in a liquid state in an environment at a temperature of 25° C. and that is soluble in water. As a result of the ink containing the water-soluble organic solvent, the ink having a shear viscosity, dynamic surface tensions, and a relaxation time within the respective specific ranges can be easily produced.

Examples of the water-soluble organic solvent include glycol compounds, polyhydric alcohol ether compounds, lactam compounds, nitrogen-containing compounds other than the lactam compounds, acetate compounds, thiodiglycol, glycerin, and dimethyl sulfoxide.

A glycol compound is a diol compound having carbon atoms two of which has each been substituted with one hydroxy group. A preferable glycol compound is alkylene glycol or polyalkylene glycol. Each of alkylene glycol and polyalkylene glycol may be straight-chain glycol or branched-chain glycol. Examples of the glycol compounds include ethylene glycol, propylene glycol, diethylene glycol, 1,3-butanediol (i.e., 1,3-butylene glycol), 1,3-propanediol (i.e., trimethylene glycol), triethylene glycol, tetraethylene glycol, 1,4-butanediol, 1,5-pentanediol, 2-methyl-1,3-propanediol, 2,2-dimethyl-1,3-propanediol, 3-methyl-1,5-pentanediol, 1,6-hexanediol, 3-methoxyl-1-butanol, 3-methoxy-3-methylbutanol, 1,2-propanediol, 1,2-butanediol, and 3-methyl-1,3-butanediol.

Examples of the polyhydric alcohol ether compounds include ethylene glycol monoethyl ether, ethylene glycol monobutyl ether, diethylene glycol diethyl ether, diethylene glycol monobutyl ether, diethylene glycol monopropyl ether, diethylene glycol monopentyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monopropyl ether, tetraethylene glycol monomethyl ether, dipropylene glycol monomethyl ether, diethylene glycol dimethyl ether, triethylene glycol dimethyl ether, tetraethylene glycol dimethyl ether, triethylene glycol diethyl ether, tetraethylene glycol diethyl ether, diethylene glycol methyl ethyl ether, triethylene glycol methyl ethyl ether, tetraethylene glycol methyl ethyl ether, tetraethylene glycol butyl methyl ether, propylene glycol dimethyl ether, and propylene glycol monomethyl ether.

Examples of the lactam compounds include 2-pyrrolidone, N-methyl-2-pyrrolidone, and N-ethylpyrolidone.

Examples of the nitrogen-containing compounds other than the lactam compounds include 1,3-dimethylimidazolidinone, formamide, dimethyl formamide, 3-methyl-2-oxazolidinone, 3-ethyl-2-oxazolidinone, N,N-dimethyl-β-methoxypropionamide, N,N-dimethyl-β-ethoxypropionamide, N,N-dimethyl-β-butoxypropionamide, N,N-dimethyl-β-pentoxypropionamide, N,N-dimethyl-β-hexyloxypropionamide, N,N-dimethyl-β-heptoxypropionamide, N,N-dimethyl-β-2-ethylhexyloxypropionamide, N,N-dimethyl-β-octoxypropionamide, N,N-diethyl-β-butoxypopionamide, N,N-diethyl-β-pentoxypropionamide, N,N-diethyl-β-hexyloxypropionamide, N,N-diethyl-β-heptoxypropionamide, and N,N-diethyl-β-octoxypropionamide.

Examples of the acetate compounds include diethylene glycol monoethyl ether acetate.

The water-soluble organic solvent is preferably at least one (preferably one to five, more preferably three or four) selected from the group consisting of a glycol compound, a polyhydric alcohol ether compound, a lactam compound, and glycerin. The water-soluble organic solvent is preferably at least one (preferably one to five, more preferably three or four) selected from the group consisting of 1,3-propanediol, propylene glycol, 1,3-butanediol, triethylene glycol monomethyl ether, triethylene glycol, glycerin, triethylene glycol monobutyl ether, 2-pyrrolidone, and 3-methyl-1,5-pentanediol.

The water-soluble organic solvent preferably has a boiling point of no higher than 250° C. As a result of the water-soluble organic solvent having a boiling point within a range such as above, the ink having landed on a recording medium can be favorably dried. This can inhibit dot bleeding and void generation on a formed image and enable formation of images with excellent scratch resistance.

Because production of an ink having a shear viscosity, dynamic surface tensions, and a relaxation time within the respective specific ranges can be facilitated, the content ratio of the water-soluble organic solvent is preferably at least 0.5% by mass and no greater than 50% by mass relative to the mass of the ink, more preferably at least 5% by mass and no greater than 50% by mass, further preferably at least 10% by mass and no greater than 50% by mass, and still further preferably at least 20% by mass and no greater than 45% by mass.

(Polysaccharide)

The ink may further contain a polysaccharide as necessary. As a result of the ink containing a polysaccharide, production of an ink having dynamic surface tensions and a relaxation time within the respective specific ranges can be facilitated. Examples of the polysaccharide include sorbitol, gum arabic, and xanthan gum. A preferable polysaccharide is sorbitol. Because production of an ink having dynamic surface tensions and a relaxation time within the respective specific ranges can be facilitated, the content ratio of the polysaccharide is preferably at least 0.5% by mass and no greater than 1.5% by mass relative to the mass of the ink. For the same reason as above, the content ratio of the polysaccharide is preferably at least 0.01% by mass and no greater than 0.10% by mass relative to mass of the water-soluble organic solvent.

(Resin)

The ink may further contain a resin as necessary. When the ink contains a resin, the resin is attached to the surfaces of pigment particles (e.g., particles of the first carbon black and particles of the second carbon black) to contribute to an increase in dispersibility of the pigment particles in the ink. At least a portion of the resin is attached to the surfaces of the pigment particles in the ink. At least a portion of the resin covers the surfaces of the pigment particles in the ink. However, a portion of the resin may disperse in the ink without being attached to the surfaces of the pigment particles.

The resin is preferably anionic. Examples of the resin include styrene-acrylic resins, styrene-maleic acid copolymers, styrene-maleic acid half-ester copolymers, vinylnaphthalene-acrylic acid copolymers, vinylnaphthalene-maleic acid copolymers, maleic acid resins, α-olefin maleic acid resins, urethane resins, ester resins, and acrylic resins. Alternatively, a resin dispersant may be used as the resin. Examples of the resin dispersant include polymeric polycarboxylic acids and polymeric amine compounds.

The resin has a mass average molecular weight of preferably at least 5000 and no greater than 100,000, more preferably at least 10,000 and no greater than 50,000, and further preferably at least 15,000 and no greater than 30,000. As a result of the resin having a mass average molecular weight of at least 5000, the ink can have excellent dispersion stability. As a result of the resin having a mass average molecular weight of no greater than 100,000, the ink can be favorably ejected from the nozzles of a recording head.

The resin has a glass transition point of preferably −20° C. or higher and 80° C. or lower, and more preferably −10° C. or higher and 20° C. or lower. As a result of the resin having a glass transition point of −20° C. or higher, images with excellent scratch resistance can be formed. As a result of the resin having a glass transition point of 80° C. or lower, images formed with the ink can be moderately soft. This can inhibit breakage and crack of the images on printed matter upon folding of the printed matter.

In order to increase dispersibility of the first carbon black and the second carbon black in the ink, the content ratio of the resin is preferably at least 7 parts by mass and no greater than 150 parts by mass relative to 150 parts by mass of a total mass of the first carbon black and the second carbon black, more preferably at least 15 parts by mass and no greater than 150 parts by mass, further preferably at least 30 parts by mass and no greater than 100 parts by mass, and particularly preferably at least 45 parts by mass and no greater than 75 parts by mass. For the same purpose as above, the content ratio of the resin is preferably at least 1% by mass and no greater than 5% by mass relative to the mass of the ink, and more preferably at least 2% by mass and no greater than 3% by mass.

(Surfactant)

The ink may further contain a surfactant as necessary. As a result of the ink containing a surfactant, wettability of the ink to a recording medium is increased. Examples of the surfactant include anionic surfactants, cationic surfactants, nonionic surfactants, and zwitterionic surfactants. Examples of the surfactant includes acetylene-based surfactants, silicone-based surfactants, acrylic acid-based surfactants, and fluorine-containing surfactants. A preferable surfactant contained in the ink is a nonionic surfactant. A preferable nonionic surfactant is an acetylene-based surfactant (e.g., a surfactant having an acetylene glycol structure), and a more preferable nonionic surfactant is an ethylene oxide adduct of acetylene glycol. The surfactant has a hydrophilic-lipophilic balance (HLB) value of preferably at least 3 and no greater than 20, more preferably at least 6 and no greater than 16, and further preferably at least 8 and no greater than 10. The HLB value of a surfactant is calculated for example using a formula "HLB value=20×(total sum of formula weight of hydrophilic portion)/molecular weight" by Griffin's method. In order to improve continuous ejectability and increase image density while inhibiting image offset, the content ratio of the surfactant is preferably at least 0.05% by mass and no greater than 10.0% by mass relative to the mass of the ink, more preferably at least 0.1% by mass and no greater than 10.0% by mass, further preferably at least 0.1% by mass and no greater than 5.0% by mass, yet further preferably at least 0.1% by mass and no greater than 2.0% by mass, and particularly preferably at least 0.5% by mass and no greater than 0.7% by mass.

(Other Components)

The ink may further contain a component other than the aforementioned components as necessary (specific examples include a solution stabilizer, a moisturizing agent, a penetrating agent, a viscosity modifier, a defoamer, and a preservative).

<Method for Producing Ink>

An example of a method for producing the ink according to the present embodiment will be described next.

(Preparation of Pigment Dispersion)

First, a pigment dispersion is prepared. Specifically, a pigment dispersion containing carbon blacks (the first carbon black and the second carbon black) is obtained by mixing a resin, the carbon blacks, water, and an optional component added as necessary (specific examples include a water-soluble organic solvent, a polysaccharide, a surfactant, a solution stabilizer, a moisturizing agent, a penetrating agent, a viscosity modifier, a defoamer, and a preservative) using a media disperser. Examples of the media disperser include a sand mill, a ball mill, a roll mill, a bead mill, a Nanomizer, and a homogenizer. A bead mill, which has high dispersion efficiency, is preferable as the media disperser. In a case in which the carbon blacks are covered with a resin, a preferable material of beads used in the bead mill is ceramics, glass, stainless steel, or zirconia because the particle diameters of the carbon blacks covered with the resin can be easily adjusted within respective desired ranges. Zirconia is more preferable. For the same reason as above, the beads used in the bead mill preferably have a diameter of at least 0.03 mm and no greater than 0.50 mm. As the diameter of the medium used in the disperser is decreased, as the filling rate of the medium is increased, or as the processing time by the disperser is increased, the particle diameters of the carbon blacks covered with the resin decrease. Additionally, the particle diameters of the carbon blacks covered with the resin may be adjusted within the respective desired ranges by classification after the processing by the disperser.

(Preparation of Ink)

Next, a mixed liquid is obtained by mixing the resultant pigment dispersion, water, and an optional component added as necessary (specific examples include a water-soluble organic solvent, a polysaccharide, a surfactant, a solution stabilizer, a moisturizing agent, a penetrating agent, and a viscosity modifier) using a stirrer. The resultant mixed liquid is filtered according to necessity. Thus, the ink is produced. A method for producing the ink according to the present embodiment has been described so far.

EXAMPLES

Hereinafter, examples of the present disclosure will be described. In the following description, "part by mass" may be referred to simply as "part". In evaluations in which errors might occur, an evaluation value was calculated by obtaining an appropriate number of measured values and calculating the arithmetic mean of the measured values in order to ensure that any errors were sufficiently small.

[Preparation of Inks]

Inks (A-1) to (A-9), (B-1) to (B-4), (C-1) to (C-7), (D-1) to (D-4), (E-1) to (E-8), and (F-1) to (F-4) of Examples and Comparative Examples were prepared. Compositions of these inks are indicated in later-described Tables 3 to 11. Tables 1 and 2 indicate compositions of pigment dispersions P1 to P10 indicated in Tables 3 to 11.

TABLE 1

| Pigment dispersion | | P1 | P2 | P3 | P4 | P5 |
|---|---|---|---|---|---|---|
| Carbon black | Type | First | Second | First | Second | First |
| | Trade name | COLOUR BLACK S160 | COLOUR BLACK FW200 | HIBLACK 970LB | COLOUR BLACK FW285 | HIBLACK 890 |
| | DBP [mL/100 g] | 128 | 160 | 65 | 175 | 95 |
| | BET [m$^2$/g] | 180 | 550 | 295 | 350 | 270 |
| Blending ratio | Carbon black [part] | 150 | 150 | 150 | 150 | 150 |
| | Resin dispersant [part] | 180 | 300 | 180 | 300 | 180 |
| | Water [part] | 670 | 550 | 670 | 550 | 670 |
| | Total [part] | 1000 | 1000 | 1000 | 1000 | 1000 |

TABLE 2

| Pigment dispersion | | P6 | P7 | P8 | P9 | P10 |
|---|---|---|---|---|---|---|
| Carbon black | Type | Second | First | Second | Other | Other |
| | Trade name | COLOUR BLACK FW182 | PRINTEX 85 | SPECIAL BLACK 6 | COLOUR BLACK FW18 | PRINTEX 90 |
| | DBP [mL/100 g] | 148 | 54 | 142 | 140 | 98 |
| | BET [m²/g] | 572 | 200 | 450 | 260 | 350 |
| Blending ratio | Carbon black [part] | 150 | 150 | 150 | 150 | 150 |
| | Resin dispersant [part] | 300 | 180 | 300 | 300 | 180 |
| | Water [part] | 550 | 670 | 550 | 550 | 670 |
| | Total [part] | 1000 | 1000 | 1000 | 1000 | 1000 |

The terms in Tables 1 and 2 are defined as follows. "First" refers to the first carbon black. "Second" refers to the second carbon black. "Other" refers to a carbon black other than the first carbon black or the second carbon black (also referred to below as a different carbon black). "DBP" refers to DBP oil absorption (unit: mL/100 g). "BET" refers to BET specific surface area (unit: m²/g). "Resin dispersant" refers to an aqueous solution of an anionic resin dispersant (aqueous solution of sodium salt of polymeric polycarboxylic acid, "POLYSTER (registered Japanese trademark) OM", product of NOF Corporation, effective ingredient concentration: 25% by mass). "Water" refers to ion exchange water.

The details of the carbon blacks indicated in Tables 1 and 2 are as follows.

COLOUR BLACK S160: "COLOUR BLACK S160", product of Orion Engineered Carbons S.A., DBP oil absorption 128 mL/100 g, BET specific surface area 180 m²/g, corresponding to the first carbon black COLOUR BLACK FW200: "COLOUR BLACK FW200", product of Orion Engineered Carbons S.A., DBP oil absorption 160 mL/100 g, BET specific surface area 550 m²/g, corresponding to the second carbon black HIBLACK 970LB: "HIBLACK 970LB", product of Orion Engineered Carbons S.A., DBP oil absorption 65 mL/100 g, BET specific surface area 295 m²/g, corresponding to the first carbon black COLOUR BLACK FW285: "COLOUR BLACK FW285", product of Orion Engineered Carbons S.A., DBP oil absorption 175 mL/100 g, BET specific surface area 350 m²/g, corresponding to the second carbon black HIBLACK 890: "HIBLACK 890", product of Orion Engineered Carbons S.A., DBP oil absorption 95 mL/100 g, BET specific surface area 270 m²/g, corresponding to the first carbon black COLOUR BLACK FW182: "COLOUR BLACK FW182", product of Orion Engineered Carbons S.A., DBP oil absorption 148 mL/100 g, BET specific surface area 572 m²/g, corresponding to the second carbon black PRINTEX 85: "PRINTEX (registered Japanese trademark) 85", product of Orion Engineered Carbons S.A., DBP oil absorption 54 mL/100 g, BET specific surface area 200 m²/g, corresponding to the first carbon black SPECIAL BLACK 6: "SPECIAL BLACK 6", product of Orion Engineered Carbons S.A., DBP oil absorption 142 mL/100 g, BET specific surface area 450 m²/g, corresponding to the second carbon black COLOUR BLACK FW18: "COLOUR BLACK FW18", product of Orion Engineered Carbons S.A., DBP oil absorption 140 mL/100 g, BET specific surface area 260 m²/g, corresponding to the different carbon black PRINTEX 90: "PRINTEX (registered Japanese trademark) 90", product of Orion Engineered Carbons S.A., DBP oil absorption 98 mL/100 g, BET specific surface area 350 m²/g, corresponding to the different carbon black <Preparation of Pigment Dispersion P1>

First, a pigment dispersion P1 indicated in Table 1 was prepared. Specifically, 150 parts of a carbon black (COLOUR BLACK S160 that is a first carbon black), 180 parts of an aqueous resin dispersant (aqueous solution of sodium salt of polymeric polycarboxylic acid, "POLYSTER (registered Japanese trademark) OM", product of NOF Corporation, effective ingredient concentration: 25% by mass), and 670 parts of ion exchange water were mixed together to obtain a mixed liquid. Using a bead mill (DYNO (registered Japanese trademark) MILL, product of Willy A. Bachofen AG), the mixed liquid was further mixed to disperse the carbon black in the mixed liquid. The dispersion using the bead mill was performed under conditions of use of zirconia beads having a diameter of 0.5 mm as a medium, a filling rate of the medium of 60%, a dispersion time of 4 hours, and a chiller temperature of 10° C. After the dispersion, the mixed liquid was taken out of the bead mill, and filtered using a membrane filter with an opening of 5 μm to obtain the pigment dispersion P1.

<Preparation of Pigment Dispersions P2 to P10>

Pigment dispersions P2 to P10 were prepared by the same method as that for preparing the pigment dispersion P1 in all aspects other than that carbon black of types indicated in Tables 1 and 2 was used, the aqueous resin dispersant solution in amounts indicated in Tables 1 and 2 was used, and ion exchange water in amounts indicated in Tables 1 and 2 was used.

<Preparation of Ink (A-1)>

Subsequently, an ink (A-1) was prepared. In detail, materials at a blending ratio indicated in the column for the ink (A-1) in Table 3 were mixed together at a rotational speed of 3000 rpm for 20 minutes in a normal temperature (25° C.) environment using a homomixer (product of PRIMIX Corporation) to obtain a mixed liquid. Specifically, the blending ratio indicated in the column for the ink (A-1) in Table 3 was: 20.0 parts of the pigment dispersion P1; 20.0 parts of the pigment dispersion P2, 5.0 parts of glycerin, 20.0 parts of 1,3-propanediol, 8.0 parts of triethylene glycol monobutyl ether, 0.5 parts of a nonionic surfactant ("Surfynol (registered Japanese trademark) 440", product of Nissin Chemical Industry Co., Ltd., ethylene oxide adduct of acetylene glycol), and 26.5 parts of ion exchange water. Next, the resultant mixed liquid was filtered using a membrane filter with an opening of 5 μm to obtain the ink (A-1). In the ink (A-1), the concentration of pigment, that is, the total concentration of the first carbon black and the second carbon black was 6% by mass.

<Preparation of Inks (A-2) to (A-9), (B-1) to (B-4), (C-1) to (C-7), (D-1) to (D-4), (E-1) to (E-8), and (F-1) to (F-4)>

Inks (A-2) to (A-9), (B-1) to (B-4), (C-1) to (C-7), (D-1) to (D-4), (E-1) to (E-8), and (F-1) to (F-4) were prepared by the same method as that for preparing the ink (A-1) in all aspects other than that the blending ratio indicated in the column for the ink (A-1) in Table 3 was changed to respective blending ratios indicated in the columns for the inks (A-2) to (A-5) in Table 3, the columns for the inks (A-6) to (A-9) in Table 4, the columns for the inks (B-1) to (B-4) in Table 5, the columns for the inks (C-1) to (C-4) in Table 6, the columns for the inks (C-5) to (C-7) in Table 7, the columns for the inks (D-1) to (D-4) in Table 8, the columns for the inks (E-1) to (E-4) in Table 9, the columns for the inks (E-5) to (E-8) in Table 10, and the columns for the inks (F-1) to (F-4) in Table 11.

[Measuring Method]

<Method for Measuring Shear Viscosity>

The shear viscosity of each of the inks (specifically, the inks (A-1) to (A-9) and (B-1) to (B-4)) were measured using a visual microfluidic rheometer ("FLUIDICAM RHEO", product of Formulaction) under the following measurement conditions. In the viscosity measurement in the following low shear rate range within a measurement range, the viscosity was measured using a glass chip for viscosity measurement with a gap of 150 μm while the shear rate was automatically changed from 10,000 s$^{-1}$ as a start to 50 s$^{-1}$ as an end, and 6 data points were plotted on a graph. In the viscosity measurement in the following high shear rate range within the measurement range by contrast, the viscosity was measured using a glass chip for viscosity measurement with a gap of 50 μm while the shear rate was automatically changed from 100,000 s$^{-1}$ as a start to 10,000 s$^{-1}$ as an end and 5 data points were plotted on a graph. In the above manner, a 50 s$^{-1}$ viscosity and a 100,000 s$^{-1}$ viscosity of the ink were determined. As a reference liquid, a 5 cP water-based viscosity reference liquid was used in the entire shear rate range. The measurement results for the 50 s$^{-1}$ viscosity and 100,000 s$^{-1}$ viscosity of the ink are shown in Tables 3 to 5.

(Conditions for Shear Viscosity Measurement)

Measurement Temperature: 39° C.

Sear rate measurement range: from 50 s$^{-1}$ to 10,000 s$^{-1}$ (low shear rate range) and from 10,000 s$^{-1}$ to 100,000 s$^{-1}$ (high shear rate range)

Microchip: "glass chip for viscosity measurement", product of Formulaction, gaps of 50 μm and 150 μm Reference liquid: "5 cP water-based viscosity reference liquid", product of Formulaction <Method for Measuring Dynamic Surface Tension>

The dynamic surface tension of each of inks (specifically, the inks (C-1) to (C-7), (D-1) to (D-4), (E-1) to (E-8), and (F-1) to (F-4)) was measured using a dynamic surface tensiometer (bubble pressure dynamic surface tensiometer, "BP100", product of KRUSS) in an environment at a temperature of 25° C. Specifically, the dynamic surface tension of the ink was measured by the maximum bubble pressure method using the dynamic surface tensiometer. In the dynamic surface tension measurement, the dynamic surface tension of the ink at a surface age of at least 10 milliseconds and no greater than 1000 milliseconds was actually measured. Next, the measured dynamic surface tension at a surface age of at least 0.01 milliseconds and less than 10 milliseconds was fitted by least-squares method so that formula (I) described in association with the embodiment was held. In the above manner, a 10-millisecond surface tension and a 50-millisecond surface tension of each of the inks (C-1) to (C-7) and (D-1) to (D-4) were obtained. The measurement results thus obtained were indicated in Tables 6 to 8. In addition, the same method was used to measure a dynamic surface tension ($\gamma_0$) at a surface age of 0.01 milliseconds, a 50-millisecond surface tension, and a dynamic surface tension ($\gamma_{eq}$) at a surface age of 1000 milliseconds of each of the inks (E-1) to (E-8) and (F-1) to (F-4). From the dynamic surface tension ($\gamma_0$) at a surface age of 0.01 milliseconds and the dynamic surface tension ($\gamma_{eq}$) at a surface age of 1000 milliseconds, a relaxation time ($\tau$) was obtained. Tables 9 to 11 show the 50-millisecond surface tensions and relaxation times thus obtained.

Note that a sample composition in which the surfactant used in the inks has been replaced with the same amount of water was prepared and the static surface tension of the resultant sample composition was measured for confirmation. The static surface tension of the sample composition was almost equivalent to the dynamic surface tension ($\gamma_0$) of each ink at a surface age of 0.01 milliseconds. Furthermore, the static surface tension of each ink was measured. The static surface tension of each ink was almost equivalent to the dynamic surface tension ($\gamma_{eq}$) of the ink at a surface age of 1000 milliseconds.

[Evaluation Method]

With respect to each of the inks (A-1) to (A-9), (B-1) to (B-4), (C-1) to (C-7), (D-1) to (D-4), (E-1) to (E-8), and (F-1) to (F-4), evaluation of each of image density, flight deflection, droplet cohesion, line width, continuous ejectability, and intermittent ejectability was performed in an environment at a temperature of 25° C. and a relative humidity of 50%. For these six types of evaluation, an inkjet recording apparatus (inkjet recording apparatus with a line recording head, testing machine of KYOCERA Document Solutions Inc.) was used as an evaluation apparatus. The ink was charged into a black ink tank of the evaluation apparatus. In the image density evaluation and the line width evaluation, A4-size plain paper ("C$^2$", product of Fuji Xerox Co., Ltd.) was used as a recording medium. In the continuous ejectability evaluation and the intermittent ejectability evaluation, copy paper ("CC90", product of Mondi) was used as a recording medium.

<Method for Evaluating Image Density>

The evaluation apparatus was set so that the amount of the ink ejected from a recording head thereof to the recording medium was 11 pL per pixel. Using the evaluation apparatus, a solid image (size: 10 cm×10 cm) was formed on the recording medium. The image density of the formed solid image was measured using a reflectance densitometer ("RD-19", product of X-Rite Inc.). Specifically, image densities of 10 respective randomly selected locations in the solid image were measured and an arithmetic mean of the 10 image densities was used as an evaluation value for image density. The arithmetic means for image density are shown in the rows titled "Image density" in Tables 3 to 11. Using the arithmetic mean for image density, the image density was evaluated in accordance with the following criteria. It is determined that when an ink is evaluated as good in the image density evaluation, images with excellent image density can be formed with the ink.

(Evaluation Criteria for Image Density)

Good: image density of at least 1.30

Poor: image density of less than 1.30

<Method for Evaluating Flight Deflection>

While the ink was ejected from each nozzle orifice in a nozzle surface of the recording head of the evaluation apparatus under conditions of an ejection speed of 8 msec and an ejection amount of 13.0 pL, an image of a droplet of the ink was captured using a high-speed camera ("Hyper Vision HPV-X2", product of Shimadzu Corporation) at a distance of 1 mm from the nozzle orifice in a direction perpendicular to the nozzle surface. A line passing through the nozzle orifice and extending in a direction perpendicular to the nozzle surface was assumed to be a reference line. The distance between the reference line and an ink droplet in a direction parallel to the nozzle surface (amount of deflection in a horizontal direction of the ink droplet) was then measured. Amounts of deflection in the horizontal direction of ink droplets were measured for 1000 respective nozzle orifices. An arithmetic mean of the measured amounts of deflection in the horizontal direction of the ink droplets for the 1000 nozzle orifices was used as an evaluation value for flight deflection. The arithmetic means of amounts of deflection in the horizontal direction of the ink droplets are shown in the rows titled "Flight deflection" in Tables 3 to 5. Using the arithmetic mean of amounts of deflection in the horizontal direction of the ink droplets, flight deflection of the ink was evaluated in accordance with the following criteria. It is determined that when an ink is evaluated as good in the flight deflection evaluation, ejection deviation of the ink from nozzles is reduced.

(Evaluation Criteria for Flight Deflection Evaluation)
  Good: amount of deviation in horizontal direction of ink droplet of less than 15 μm
  Poor: amount of deviation in horizontal direction of ink droplet of 15 μm or greater <Method for Evaluating Droplet Cohesion>

The ink was ejected from the nozzle orifices in the nozzle surface of the recording head of the evaluation apparatus under conditions of an ejection speed of 8 m/second and an ejection amount of 13.0 pL. Images of droplets of the ink were captured at time of ejection using a high-speed camera ("Hyper Vision HPV-X2", product of Shimadzu Corporation). The tail length was calculated for each ink from the number of pixels ranging from the upper end of a main drop of each capcured ink droplet to the upper end of a tail of the ink droplet. The obtained tail lengths are indicated in the rows titled "Droplet cohesion" in Tables 6 to 8. Cohesion of ink droplets (droplet cohesion) of each ink was evaluated using the tail length in accordance with the following criteria.

(Evaluation Criteria for Droplet Cohesion)
  Good: tail length of less than 0.30 mm
  Poor: tail length of 0.30 mm or greater <Method for Evaluating Line Width>

The ink was ejected from the nozzle orifices in the nozzle surface of the recording head of the evaluation apparatus under conditions of an ejection speed of 8 m/second and an ejection amount of 13.0 pL to form an image of a line (one-dot line) with a line width equivalent to one dot. The formed image was observed using a measurement microscope ("MM-800", product of NIKON CORPORATION). The line width of the one-dot line of the observed image was calculated using a length measurement function of image integration software ("NIS Elements Ver. 3.2", product of NIKON CORPORATION). The calculated line widths are indicated in the rows titled "Line width" in Tables 6 to 8. The line widths were evaluated in accordance with the following criteria. It is determined that when an ink is rated as good in the line width evaluation, wet spreading of the ink in a recording medium is suppressed.

(Evaluation Criteria for Line Width)
  Good: line width of at least 70.0 μm and no greater than 85.0 μm
  Poor: line width of less than 70.0 μm or greater than 85.0 μm <Method for Evaluating Continuous Ejectability and Intermittent Ejectability>

The evaluation apparatus was set so that the oscillation frequency of the recording head thereof which was of piezoelectric type was 20 kHz. Using the evaluation apparatus, a solid image (coverage rate: 100%) was printed successively on sheets of the recording medium for 30 minutes. Next, a pattern image for nozzle checking was printed on one sheet of the recording medium using the evaluation apparatus, and taken as a first evaluation image.

Next, the evaluation apparatus with the black ink tank filled with the ink was left to stand in an environment at a temperature of 25° C. for 6 hours. Subsequently, a pattern image for nozzle checking was printed on one sheet of the recording medium using the evaluation apparatus, and taken as a second evaluation image.

The first evaluation image and the second evaluation image were visually observed to check for the presence or absence of nozzle omission. Continuous ejectability and intermittent ejectability were then evaluated in accordance with the following criteria. Results of the continuous ejectability evaluation and results of the intermittent ejectability evaluation are respectively shown in the rows titled "Continuous ejectability" and "Intermittent ejectability" in Tables 9 to 11.

(Evaluation Criteria for Continuous Ejectability)
  Evaluation A: no nozzle omission was observed in any of 7000 nozzles in the first evaluation image.
  Evaluation B: nozzle omission was observed in one to five nozzles of the 7000 nozzles in the first evaluation image.
  Evaluation C (poor): nozzle omission was observed in six or more nozzles of the 7000 nozzles in the first evaluation image.

(Evaluation Criteria for Intermittent Ejectability)
  Evaluation A: no nozzle omission was observed in any of the 7000 nozzles in the second evaluation image.
  Evaluation B: nozzle omission was observed in one to five nozzles of the 7000 nozzles in the second evaluation image.
  Evaluation C (poor): nozzle omission was observed in six or more nozzles of the 7000 nozzles in the second evaluation image.

The terms in Tables 3 to 11 are defined as follows. "First" in the rows titled "Pigment dispersion" refers to a pigment dispersion containing a corresponding first carbon black. "Second" in the rows titled "Pigment dispersion" refers to a pigment dispersion containing a corresponding second carbon black. "Other" in the rows titled "Pigment dispersion" refers to a pigment dispersion containing a corresponding different carbon black. "Surfynol" refers to a nonionic surfactant ("SURFYNOL (registered Japanese trademark) 440", product of Nissin Chemical Industry Co., Ltd., ethylene oxide adduct of acetylene glycol). "BTG" produced by NIPPON NYUKAZAI CO., LTD. was used as "triethylene glycol monobutyl ether". "Water" refers to ion exchange water. "Aqueous sorbitol solution" refers to an aqueous sorbitol solution ("SORBITOL F", product of B Food Science Co., Ltd., concentration 70% by mass). "MPD" refers to 3-methyl-1,5-pentanediol. "DBP difference" refers to a difference between the DBP oil absorption of a corresponding first carbon black and the DBP oil absorption of a corresponding second carbon black. "BET difference" refers to a difference between the BET specific surface area of a corresponding first carbon black and the BET specific surface area of a corresponding second carbon black. "Viscosity ($50\ s^{-1}$)" refers to a $50\ s^{-1}$ viscosity of a corresponding ink. "Viscosity ($100{,}000\ s^{-1}$)" refers to a $100{,}000\ s^{-1}$ viscosity of a corresponding ink. "Surface tension (10 ms)" refers to a 10-millisecond surface tension of a corresponding ink. "Surface tension (50 ms)" refers to a 50-millisecond surface tension of a corresponding ink. "ms" refers to millisecond. The sign "-" refers to non-containment of or no value for a corresponding component. "NG" refers to poor in evaluation result.

TABLE 3

| | Ink | | Example 1 A-1 | Example 2 A-2 | Example 3 A-3 | Example 4 A-4 | Example 5 A-5 |
|---|---|---|---|---|---|---|---|
| Blending ratio | Pigment dispersion | First | P1 | P3 | P5 | P7 | P1 |
| | | Amount [part] | 20.0 | 20.0 | 20.0 | 20.0 | 20.0 |
| | | Second | P2 | P4 | P6 | P8 | P2 |
| | | Amount [part] | 20.0 | 20.0 | 20.0 | 20.0 | 20.0 |
| | | Other | — | — | — | — | — |
| | | Amount [part] | — | — | — | — | — |
| | Glycerin | [part] | 5.0 | 5.0 | 5.0 | 5.0 | 5.0 |
| | 1,3-Propanediol | [part] | 20.0 | 20.0 | 20.0 | 20.0 | — |
| | Propylene glycol | [part] | — | — | — | — | 20.0 |
| | 1,3-Butanediol | [part] | — | — | — | — | — |
| | Triethylene glycol monobutyl ether | [part] | 8.0 | 10.0 | 8.0 | 8.0 | 8.0 |
| | Triethylene glycol monomethyl ether | [part] | — | — | — | — | — |
| | Triethylene glycol | [part] | — | — | — | — | — |
| | Surfynol | [part] | 0.5 | 0.5 | 0.5 | 0.5 | 0.5 |
| | Water | [part] | 26.5 | 24.5 | 26.5 | 26.5 | 26.5 |
| | Total | [part] | 100.0 | 100.0 | 100.0 | 100.0 | 100.0 |
| Property | DBP difference | [mL/100 g] | 32 | 110 | 53 | 88 | 32 |
| | BET difference | [m²/g] | 370 | 55 | 302 | 250 | 370 |
| | Viscosity ($50\ s^{-1}$) | [mPa · s] | 6 | 7 | 8 | 8 | 8 |
| | Viscosity ($100{,}000\ s^{-1}$) | [mPa · s] | 5 | 6 | 6 | 5 | 5 |
| Evaluation | Image density | | 1.34 | 1.36 | 1.34 | 1.35 | 1.35 |
| | Flight deflection | [μm] | 12 | 12 | 14 | 13 | 12 |

TABLE 4

| | Ink | | Example 6 A-6 | Example 7 A-7 | Example 8 A-8 | Example 9 A-9 |
|---|---|---|---|---|---|---|
| Blending ratio | Pigment dispersion | First | P1 | P1 | P1 | P3 |
| | | Amount [part] | 20.0 | 20.0 | 30.0 | 30.0 |
| | | Second | P2 | P2 | P2 | P4 |
| | | Amount [part] | 20.0 | 20.0 | 10.0 | 10.0 |
| | | Other | — | — | — | — |
| | | Amount [part] | — | — | — | — |
| | Glycerin | [part] | 5.0 | 5.0 | 5.0 | 5.0 |
| | 1,3-Propanediol | [part] | — | — | — | 8.0 |
| | Propylene glycol | [part] | — | — | — | — |
| | 1,3-Butanediol | [part] | 10.0 | — | — | — |
| | Triethylene glycol monobutyl ether | [part] | 8.0 | 8.0 | 8.0 | 8.0 |
| | Triethylene glycol monomethyl ether | [part] | — | 10.0 | — | 12.0 |
| | Triethylene glycol | [part] | — | 10.0 | 8.0 | — |
| | Surfynol | [part] | 0.5 | 0.5 | 0.5 | 0.5 |
| | Water | [part] | 36.5 | 26.5 | 38.5 | 26.5 |
| | Total | [part] | 100.0 | 100.0 | 100.0 | 100.0 |
| Property | DBP difference | [mL/100 g] | 32 | 32 | 32 | 110 |
| | BET difference | [m²/g] | 370 | 370 | 370 | 55 |
| | Viscosity ($50\ s^{-1}$) | [mPa · s] | 8 | 8 | 8 | 8 |
| | Viscosity ($100{,}000\ s^{-1}$) | [mPa · s] | 5 | 5 | 5 | 5 |
| Evaluation | Image density | | 1.35 | 1.35 | 1.35 | 1.35 |
| | Flight deflection | [μm] | 14 | 13 | 13 | 13 |

TABLE 5

| | Ink | | Comparative Example 1 B-1 | Comparative Example 2 B-2 | Comparative Example 3 B-3 | Comparative Example 4 B-4 |
|---|---|---|---|---|---|---|
| Blending ratio | Pigment dispersion | First | P1 | — | P1 | — |
| | | Amount [part] | 40.0 | — | 20.0 | — |
| | | Second | — | P2 | — | P2 |
| | | Amount [part] | — | 40.0 | — | 20.0 |
| | | Other | — | — | P9 | P10 |
| | | Amount [part] | — | — | 20.0 | 20.0 |
| | Glycerin | [part] | 5.0 | 5.0 | 5.0 | 5.0 |
| | 1,3-Propanediol | [part] | 20.0 | 20.0 | 20.0 | 20.0 |
| | Propylene glycol | [part] | — | — | — | — |
| | 1,3-Butanediol | [part] | — | — | — | — |
| | Triethylene glycol monobutyl ether | [part] | 8.0 | 8.0 | 8.0 | 8.0 |
| | Triethylene glycol monomethyl ether | [part] | — | — | — | — |
| | Triethylene glycol | [part] | — | — | — | — |
| | Surfynol | [part] | 0.5 | 0.5 | 0.5 | 0.5 |
| | Water | [part] | 26.5 | 26.5 | 26.5 | 26.5 |
| | Total | [part] | 100.0 | 100.0 | 100.0 | 100.0 |
| Property | DBP difference | [mL/100 g] | — | — | — | — |
| | BET difference | [m$^2$/g] | — | — | — | — |
| | Viscosity (50 s$^{-1}$) | [mPa · s] | 5 | 9 | 6 | 9 |
| | Viscosity (100,000 s$^{-1}$) | [mPa · s] | 4 | 8 | 4 | 8 |
| Evaluation | Image density | | 1.12 (NG) | 1.35 | 1.13 (NG) | 1.34 |
| | Flight deflection | [μm] | 16 (NG) | 15 (NG) | 16 (NG) | 16 (NG) |

TABLE 6

| | Ink | | Example 10 C-1 | Example 11 C-2 | Example 12 C-3 | Example 13 C-4 |
|---|---|---|---|---|---|---|
| Blending ratio | Pigment dispersion | First | P1 | P3 | P5 | P7 |
| | | Amount [part] | 20.0 | 20.0 | 20.0 | 20.0 |
| | | Second | P2 | P4 | P6 | P8 |
| | | Amount [part] | 20.0 | 20.0 | 20.0 | 20.0 |
| | | Other | — | — | — | — |
| | | Amount [part] | — | — | — | — |
| | Glycerin | [part] | 5.0 | 5.0 | 5.0 | 5.0 |
| | Propylene glycol | [part] | — | — | — | — |
| | Aqueous sorbitol solution | [part] | 1.5 | 1.5 | 1.5 | 1.5 |
| | 2-Pyrrolidone | [part] | 1.5 | 1.5 | 1.5 | 1.5 |
| | MPD | [part] | 12.0 | 12.0 | 12.0 | 12.0 |
| | Triethylene glycol | [part] | 3.0 | 3.0 | 3.0 | 3.0 |
| | Surfynol | [part] | 0.7 | 0.5 | 0.6 | 0.5 |
| | Water | [part] | 36.3 | 36.5 | 36.4 | 36.5 |
| | Total | [part] | 100.0 | 100.0 | 100.0 | 100.0 |
| Property | DBP difference | [mL/100 g] | 32 | 110 | 53 | 88 |
| | BET difference | [m$^2$/g] | 370 | 55 | 302 | 250 |
| | Surface tension (10 ms) | [mN/m] | 39.5 | 41.0 | 40.5 | 40.0 |
| | Surface tension (50 ms) | [mN/m] | 37.9 | 39.0 | 38.0 | 37.5 |
| Evaluation | Image density | | 1.34 | 1.36 | 1.34 | 1.35 |
| | Droplet cohesion | [mm] | 0.29 | 0.26 | 0.28 | 0.28 |
| | Line width | [μm] | 76.0 | 74.0 | 75.0 | 75.5 |

TABLE 7

| | Ink | | Example 14 C-5 | Example 15 C-6 | Example 16 C-7 |
|---|---|---|---|---|---|
| Blending ratio | Pigment dispersion | First | P1 | P1 | P1 |
| | | Amount [part] | 20.0 | 30.0 | 18.0 |
| | | Second | P2 | P2 | P6 |
| | | Amount [part] | 20.0 | 10.0 | 22.0 |
| | | Other | — | — | — |
| | | Amount [part] | — | — | — |
| | Glycerin | [part] | — | 5.0 | 5.0 |
| | Propylene glycol | [part] | 5.0 | — | — |
| | Aqueous sorbitol solution | [part] | 1.5 | 1.5 | 1.5 |
| | 2-Pyrrolidone | [part] | 1.5 | 1.5 | 1.5 |
| | MPD | [part] | 12.0 | 12.0 | 12.0 |

TABLE 7-continued

|  |  |  | Example 14 C-5 | Example 15 C-6 | Example 16 C-7 |
|---|---|---|---|---|---|
|  | Triethylene glycol | [part] | 3.0 | 3.0 | 3.0 |
|  | Surfynol | [part] | 0.7 | 0.7 | 0.7 |
|  | Water | [part] | 36.3 | 36.3 | 36.3 |
|  | Total | [part] | 100.0 | 100.0 | 100.0 |
| Property | DBP difference | [mL/100 g] | 32 | 32 | 20 |
|  | BET difference | [m$^2$/g] | 370 | 370 | 392 |
|  | Surface tension (10 ms) | [mN/m] | 39.5 | 39.2 | 39.0 |
|  | Surface tension (50 ms) | [mN/m] | 37.9 | 37.6 | 36.5 |
| Evaluation | Image density |  | 1.35 | 1.37 | 1.31 |
|  | Droplet cohesion | [mm] | 0.29 | 0.29 | 0.29 |
|  | Line width | [µm] | 76.0 | 76.3 | 76.5 |

TABLE 8

|  |  | Ink |  | Comparative Example 5 D-1 | Comparative Example 6 D-2 | Comparative Example 7 D-3 | Comparative Example 8 D-4 |
|---|---|---|---|---|---|---|---|
| Blending ratio | Pigment dispersion | First |  | P1 | — | P1 | — |
|  |  | Amount [part] |  | 40.0 | — | 20.0 | — |
|  |  | Second |  | — | P2 | — | P2 |
|  |  | Amount [part] |  | — | 40.0 | — | 20.0 |
|  |  | Other |  | — | — | P9 | P10 |
|  |  | Amount [part] |  | — | — | 20.0 | 20.0 |
|  | Glycerin |  | [part] | 5.0 | 5.0 | 5.0 | 5.0 |
|  | Propylene glycol |  | [part] | — | — | — | — |
|  | Aquepis sorbitol solution |  | [part] | 1.5 | 1.5 | 1.5 | 1.5 |
|  | 2-Pyrrolidone |  | [part] | 1.5 | 1.5 | 1.5 | 1.5 |
|  | MPD |  | [part] | 12.0 | 12.0 | 12.0 | 12.0 |
|  | Triethylene glycol |  | [part] | 3.0 | 3.0 | 3.0 | 3.0 |
|  | Surfynol |  | [part] | 0.4 | 0.1 | 0.1 | 0.1 |
|  | Water |  | [part] | 36.6 | 36.9 | 36.9 | 36.9 |
|  | Total |  | [part] | 100.0 | 100.0 | 100.0 | 100.0 |
| Property | DBP difference |  | [mL/100 g] | — | — | — | — |
|  | BET difference |  | [m$^2$/g] | — | — | — | — |
|  | Surface tension (10 ms) |  | [mN/m] | 41.8 | 44.6 | 45.0 | 44.8 |
|  | Surface tension (50 ms) |  | [mN/m] | 39.6 | 41.6 | 42.2 | 42.0 |
| Evaluation | Image density |  |  | 1.12 (NG) | 1.33 | 1.19 (NG) | 1.33 |
|  | Droplet cohesion |  | [mm] | 0.25 | 0.24 | 0.26 | 0.28 |
|  | Line width |  | [µm] | 73.0 | 69.0 (NG) | 68.0 (NG) | 69.0 (NG) |

TABLE 9

|  |  | Ink |  | Example 17 E-1 | Example 18 E-2 | Example 19 E-3 | Example 20 E-4 |
|---|---|---|---|---|---|---|---|
| Blending ratio | Pigment dispersion | First |  | P1 | P3 | P5 | P7 |
|  |  | Amount [part] |  | 20.0 | 20.0 | 20.0 | 20.0 |
|  |  | Second |  | P2 | P4 | P6 | P8 |
|  |  | Amount [part] |  | 20.0 | 20.0 | 20.0 | 20.0 |
|  |  | Other |  | — | — | — | — |
|  |  | Amount [part] |  | — | — | — | — |
|  | Glycerin |  | [part] | 5.0 | 5.0 | 5.0 | 5.0 |
|  | Propylene glycol |  | [part] | — | — | — | — |
|  | Aqueous sorbitol solution |  | [part] | 1.5 | 1.5 | 1.5 | 1.5 |
|  | 2-Pyrrolidone |  | [part] | 1.5 | 1.5 | 1.5 | 1.5 |
|  | MPD |  | [part] | 12.0 | 12.0 | 12.0 | 12.0 |
|  | Triethylene glycol |  | [part] | 3.0 | 3.0 | 3.0 | 3.0 |
|  | Surfynol |  | [part] | 0.5 | 0.6 | 0.3 | 0.2 |
|  | Triethylene glycol monobutyl ether |  | [part] | — | — | — | — |
|  | Water |  | [part] | 36.5 | 36.4 | 36.7 | 36.8 |
|  | Total |  | [part] | 100.0 | 100.0 | 100.0 | 100.0 |
| Property | DBP difference |  | [mL/100 g] | 32 | 110 | 53 | 88 |
|  | BET difference |  | [m$^2$/g] | 370 | 55 | 302 | 250 |
|  | Surface tension (50 ms) |  | [mN/m] | 40.0 | 41.0 | 40.5 | 42.0 |
|  | Relaxation time |  | [mN/m] | 20 | 30 | 35 | 25 |

TABLE 9-continued

| | Ink | Example 17 E-1 | Example 18 E-2 | Example 19 E-3 | Example 20 E-4 |
|---|---|---|---|---|---|
| Evaluation | Image density | 1.34 | 1.36 | 1.34 | 1.35 |
| | Continuous ejectability | A | A | A | A |
| | Intermittent ejectability | A | A | A | A |

TABLE 10

| | Ink | | Example 21 E-5 | Example 22 E-6 | Example 23 E-7 | Example 24 E-8 |
|---|---|---|---|---|---|---|
| Blending ratio | Pigment dispersion | First | P1 | P1 | P1 | P1 |
| | | Amount [part] | 20.0 | 30.0 | 18.0 | 20.0 |
| | | Second | P2 | P2 | P6 | P2 |
| | | Amount [part] | 20.0 | 10.0 | 22.0 | 20.0 |
| | | Other | — | — | — | — |
| | | Amount [part] | — | — | — | — |
| | Glycerin | [part] | — | 5.0 | 5.0 | 5.0 |
| | Propylene glycol | [part] | 5.0 | — | — | — |
| | Aqueous sorbitol solution | [part] | 1.5 | 1.5 | 1.5 | 1.5 |
| | 2-Pyrrolidone | [part] | 1.5 | 1.5 | 1.5 | 1.5 |
| | MPD | [part] | 12.0 | 12.0 | 12.0 | 12.0 |
| | Triethylene glycol | [part] | 3.0 | 3.0 | 3.0 | 3.0 |
| | Surfynol | [part] | 0.6 | 0.6 | 0.6 | 0.5 |
| | Triethylene glycol monobutyl ether | [part] | — | — | — | 5.0 |
| | Water | [part] | 36.4 | 36.4 | 36.4 | 31.5 |
| | Total | [part] | 100.0 | 100.0 | 100.0 | 100.0 |
| Property | DBP difference | [mL/100 g] | 32 | 32 | 20 | 20 |
| | BET difference | [m$^2$/g] | 370 | 370 | 392 | 392 |
| | Surface tension (50 ms) | [mN/m] | 41.0 | 40.5 | 41.5 | 36.0 |
| | Relaxation time | [ms] | 50 | 40 | 35 | 30 |
| Evaluation | Image density | | 1.35 | 1.37 | 1.31 | 1.30 |
| | Continuous ejectability | | A | A | A | A |
| | Intermittent ejectability | | A | A | A | B |

TABLE 11

| | Ink | | Comparative Example 9 F-1 | Comparative Example 10 F-2 | Comparative Example 11 F-3 | Comparative Example 12 F-4 |
|---|---|---|---|---|---|---|
| Blending ratio | Pigment dispersion | First | P1 | — | P1 | — |
| | | Amount [part] | 40.0 | — | 20.0 | — |
| | | Second | — | P2 | — | P2 |
| | | Amount [part] | — | 40.0 | — | 20.0 |
| | | Other | — | — | P9 | P10 |
| | | Amount [part] | — | — | 20.0 | 20.0 |
| | Glycerin | [part] | 5.0 | 5.0 | 5.0 | 5.0 |
| | Propylene glycol | [part] | — | — | — | — |
| | Aqueous sorbitol solution | [part] | 1.5 | 1.5 | 1.5 | 1.5 |
| | 2-Pyrrolidone | [part] | 1.5 | 1.5 | 1.5 | 1.5 |
| | MPD | [part] | 18.0 | 18.0 | 15.0 | 20.0 |
| | Triethylene glycol | [part] | 3.0 | 6.0 | 3.0 | 3.0 |
| | Surfynol | [part] | 0.9 | 0.5 | 0.9 | 0.5 |
| | Triethylene glycol monobutyl ether | [part] | — | — | — | — |
| | Water | [part] | 30.1 | 27.5 | 33.1 | 28.5 |
| | Total | [part] | 100.0 | 100.0 | 100.0 | 100.0 |
| Property | DBP difference | [mL/100 g] | — | — | — | — |
| | BET difference | [m$^2$/g] | — | — | — | — |
| | Surface tension (50 ms) | [mN/m] | 38.0 | 39.0 | 35.0 | 39.0 |
| | Relaxation time | [ms] | 10 | 15 | 13 | 19 |
| Evaluation | Image density | | 1.12 (NG) | 1.16 (NG) | 1.19 (NG) | 1.16 (NG) |
| | Continuous ejectability | | C (NG) | C (NG) | C (NG) | C (NG) |
| | Intermittent ejectability | | C (NG) | C (NG) | C (NG) | C (NG) |

Each of the inks (A-1) to (A-9), (C-1) to (C-7), and (E-1) to (E-8) contained the first carbon black, the second carbon black, and water. As such, the inks (A-1) to (A-9) were rated as good in both the image density evaluation and the flight deflection evaluation as shown in Tables 3 and 4. Also, the inks (C-1) to (C-7) were rated as good in both the image density evaluation and the line width evaluation as shown in Tables 6 and 7. As shown in Tables 6 and 7, the tail length of each ink droplet of the inks (C-1) to (C-7) was less than 0.30 mm and easiness of droplet cohesion of the ink was maintained without impairment thereof. Furthermore, as shown in Tables 9 and 10, the inks (E-1) to (E-8) were rated as good in any of the image density evaluation, the continuous ejectability evaluation, and the intermittent ejectability evaluation.

By contrast, the inks (B-1) to (B-4) contained only one of the first carbon black and the second carbon black. As such, the inks (B-1) to (B-4) were rated as poor in at least one of the image density evaluation and the flight deflection evaluation as shown in Table 5. The inks (D-1) to (D-4) contained only one of the first carbon black and the second carbon black. As such, the inks (D-1) to (D-4) were rated as poor in at least one of the image density evaluation and the line width evaluation as shown in Table 8. The inks (F-1) to (F-4) contained only one of the first carbon black and the second carbon black. As such, the inks (F-1) to (F-4) were rated as poor in each of the image density evaluation, the continuous ejectability evaluation, and the intermittent ejectability evaluation as shown in Table 11.

It was demonstrated from the above that use of the ink according to the present disclosure, which encompasses the inks (A-1) to (A-9), (C-1) to (C-7), and (E-1) to (E-8), can achieve formation of images with excellent image density, reduction in ejection deviation of the ink from nozzles, improvement in continuous ejectability and intermittent ejectability, and suppression of wet spreading in a recording medium.

What is claimed is:

1. An inkjet ink comprising at least:
   a first carbon black having a DBP oil absorption of less than 130 mL/100 g and a BET specific surface area of less than 300 m2/g;
   a second carbon black having a DBP oil absorption of at least 130 mL/100 g and a BET specific surface area of at least 300 m2/g; and water; wherein
   a difference between the DBP oil absorption of the first carbon black and the DBP oil absorption of the second carbon black is at least 20 mL/100 g and no greater than 110 mL/100 g.

2. An inkjet ink comprising at least:
   a first carbon black having a DBP oil absorption of less than 130 mL/100 g and a BET specific surface area of less than 300 m2/g;
   a second carbon black having a DBP oil absorption of at least 130 mL/100 g and a BET specific surface area of at least 300 m2/g; and water; wherein
   a difference between the BET specific surface area of the first carbon black and the BET specific surface area of the second carbon black is at least 50 m2/g and no greater than 400 m2/g.

3. The inkjet ink according to claim 1, which has a shear viscosity of at least 6 mPa·s and no greater than 8 mPa·s at a temperature of 39° C. and a shearing speed of 50 s$^{-1}$, and a shear viscosity of at least 4 mPa·s and no greater than 6 mPa·s at a temperature of 39° C. and a shearing speed of 100,000 s$^{-1}$.

4. The inkjet ink according to claim 1, which has a dynamic surface tension at a surface age of 10 milliseconds of at least 39.0 mN/m and no greater than 43.0 mN/m as measured by a maximum bubble pressure method, and a dynamic surface tension at a surface age of 50 milliseconds of at least 36.0 mN/m and no greater than 41.0 mN/m as measured by the maximum bubble pressure method.

5. The inkjet ink according to claim 1, which has a dynamic surface tension at a surface age of 50 milliseconds of at least 40.0 mN/m as measured by a maximum bubble pressure method, and a relaxation time of at least 20 milliseconds and no greater than 50 milliseconds as measured by the maximum bubble pressure method.

6. The inkjet ink according to claim 2, which has a shear viscosity of at least 6 mPa·s and no greater than 8 mPa·s at a temperature of 39° C. and a shearing speed of 50 s$^{-1}$, and a shear viscosity of at least 4 mPa·s and no greater than 6 mPa·s at a temperature of 39° C. and a shearing speed of 100,000 s$^{-1}$.

7. The inkjet ink according to claim 2, which has a dynamic surface tension at a surface age of 10 milliseconds of at least 39.0 mN/m and no greater than 43.0 mN/m as measured by a maximum bubble pressure method, and a dynamic surface tension at a surface age of 50 milliseconds of at least 36.0 mN/m and no greater than 41.0 mN/m as measured by the maximum bubble pressure method.

8. The inkjet ink according to claim 2, which has a dynamic surface tension at a surface age of 50 milliseconds of at least 40.0 mN/m as measured by a maximum bubble pressure method, and a relaxation time of at least 20 milliseconds and no greater than 50 milliseconds as measured by the maximum bubble pressure method.

* * * * *